Oct. 5, 1943.     O. M. WHITTEN     2,331,259
BRAKE CONSTRUCTION
Filed Sept. 2, 1941     3 Sheets-Sheet 1

INVENTOR.
OWEN M. WHITTEN
BY
ATTORNEYS

Oct. 5, 1943.                O. M. WHITTEN                2,331,259
                           BRAKE CONSTRUCTION
                         Filed Sept. 2, 1941            3 Sheets-Sheet 2

INVENTOR.
OWEN M. WHITTEN
BY
ATTORNEYS

Oct. 5, 1943.  O. M. WHITTEN  2,331,259
BRAKE CONSTRUCTION
Filed Sept. 2, 1941  3 Sheets-Sheet 3
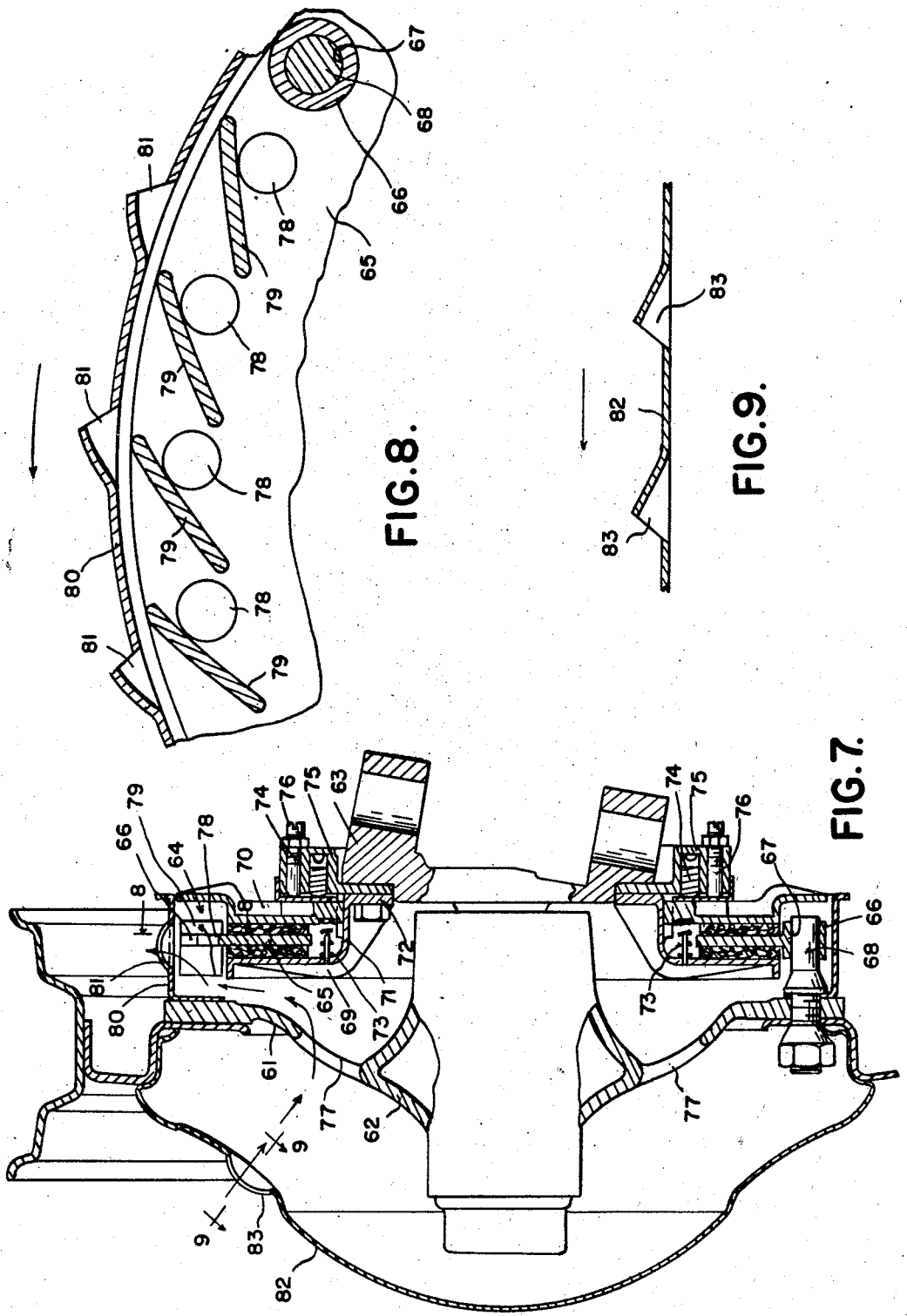
INVENTOR.
OWEN M. WHITTEN
BY
ATTORNEYS Patented Oct. 5, 1943

2,331,259

UNITED STATES PATENT OFFICE 2,331,259

BRAKE CONSTRUCTION

Owen M. Whitten, Detroit, Mich., assignor to Kelsey-Hayes Wheel Company, Detroit, Mich., a corporation of Delaware Application September 2, 1941, Serial No. 409,289

4 Claims. (Cl. 188—72)

The invention relates to brake constructions and refers more particularly to disc brakes for vehicle wheels.

The invention has for one of its objects to provide an improved disc brake constructed to secure efficient cooling.

The invention has for another object to so construct the brake that the rotatable friction element has a ribbed head which is exposed to the air to effect cooling of the brake.

The invention has for a further object to construct the ribbed head so that upon rotation it functions as a fan.

These and other objects of the invention will become apparent from the following description, taken in connection with the accompanying drawings, in which Figure 1 is an inboard elevation of a brake construction showing an embodiment of the invention;

Figures 2 and 3 are cross sections on the lines 2—2 and 3—3, respectively, of Figure 1;

Figures 4 and 5 are cross sections on the lines 4—4 and 5—5, respectively, of Figure 2;

Figure 7 is a view similar to Figure 2 showing still another embodiment of the invention;

Figure 2:
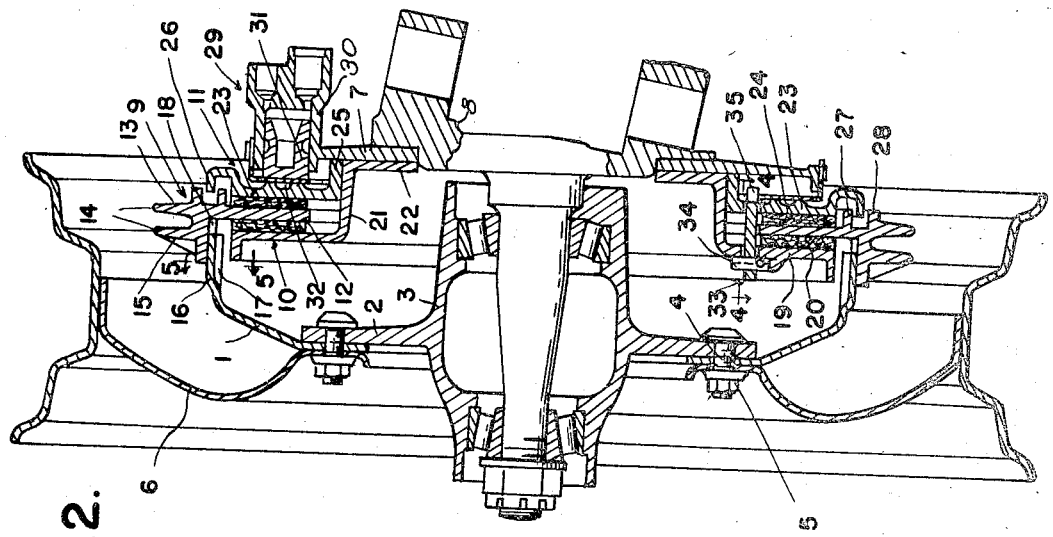
Figure 1:
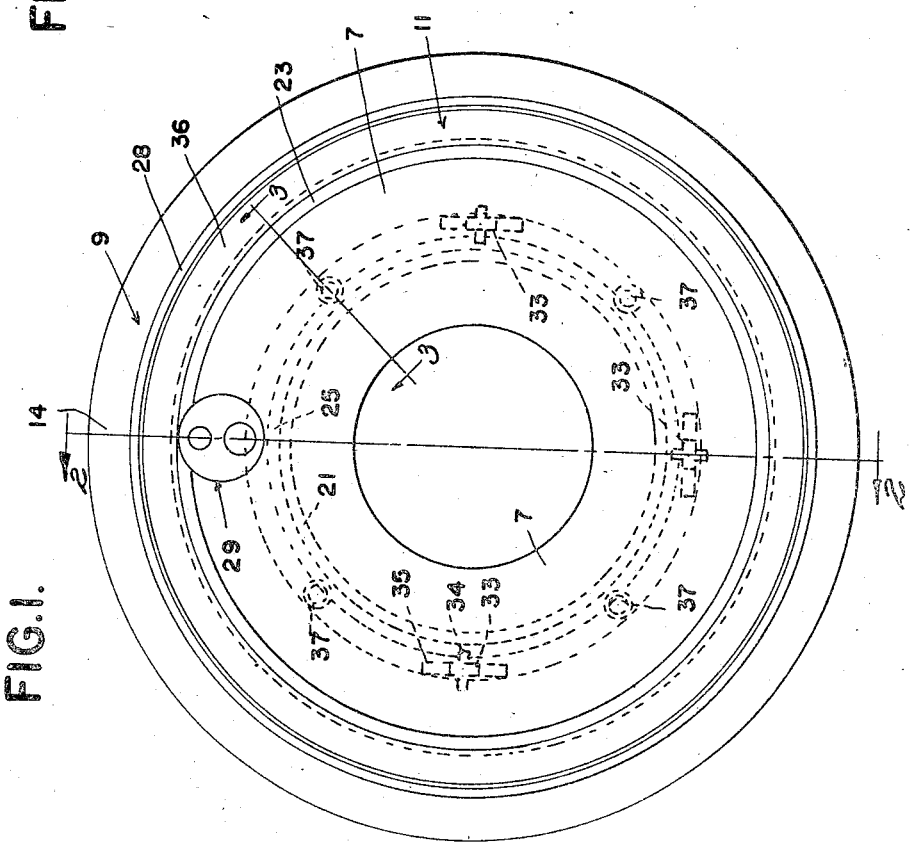
Figure 3:
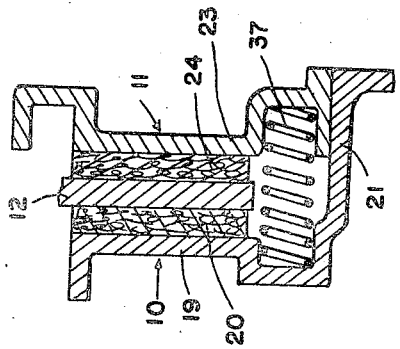
Figure 4:
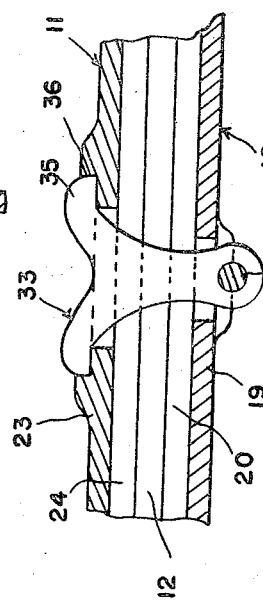
Figure 5:
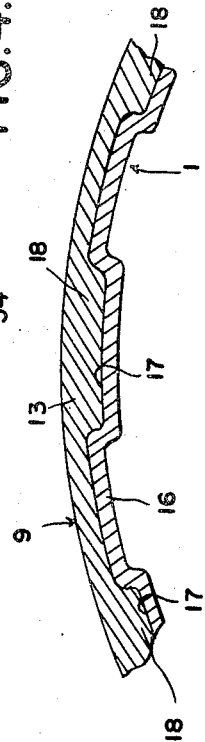

Figures 8 and 9 are cross sections on the lines 8—8 and 9—9, respectively, of Figure 7.

Referring to Figures 1 to 5, inclusive, 1 is a cup-shaped rotatable carrier secured to the fixed flange 2 of the wheel hub 3 by suitable means, such as the bolts 4 and the nuts 5, which are also used in securing the wheel 6 to the hub. 7 is a non-rotatable carrier secured to the axle housing 8. 9 is a rotatable friction element mounted on the rotatable carrier 1 and 10 and 11 are friction elements at opposite sides of the friction element 9 and carried by the non-rotatable carrier 7. These friction elements are in the nature of discs.

The rotatable friction element 9 has the disc body 12 and the head 13, which latter is provided with the annular radially outwardly extending cooling ribs 14 and also the series of radial cooling ribs 15 extending axially from the ribs 14. The head 13 is located radially outwardly of the rotatable carrier 1 and is exposed to the air so that it serves in effectively conducting the heat created upon braking away from the disc body. The rotatable friction element is axially slidable mounted on the rotatable carrier by forming the annular flange 16 of the latter with axially extending keyways 17 and by providing axially extending projections 18 on the head fitting the keyways. The friction element 10 has the disc body 19 to which is secured the lining 20 for engaging the outboard side of the disc body 12 of the rotatable friction element. The friction element 10 is also formed with the annular axially extending portion 21 radially inwardly of the disc body 12 and terminating in the radially inwardly extending flange 22 which is fixedly secured to the non-rotatable carrier 7 by suitable means. The friction element 11 is formed with the disc body 23 to which is secured the lining 24 for frictionally engaging the inboard side of the disc body 12 of the rotatable friction element. The friction element 11 is formed at its inner edge with the annular flange 25 which is rotatably sleeved on the annular portion 21 of the non-rotatable friction element 10. Also, the friction element 11 is provided at its periphery with the axially extending flange 26 which extends into an annular groove formed by the axially extending ribs 27 and 28, respectively, on the disc body 12 and the head 13 of the rotatable friction element. It will be noted that the ribs 28 also serves in conducting the heat generated during braking to the air.

29 is a fluid pressure operated actuator comprising the cylinder 30 fixedly mounted on the non-rotatable carrier 7 and the piston 31 slidable within the cylinder and abutting the plate 32 which in turn abuts the disc body 23 of the friction element 11. For assisting the actuator to force the friction element 11 axially into engagement with the rotatable friction element 9 and the latter then into engagement with the non-rotatable friction element 10, I have provided the ties 33. These ties extend transversely through the disc bodies of the friction elements 10 and 11 radially inwardly of the disc body of the rotatable friction element 9 and they are pivotally secured to the non-rotatable friction element 10 by the pins 34. The other ends of the ties are formed with the oppositely extending legs 35 abutting the inboard side of the friction element 11 and also the transverse shoulders 36 of this friction element. The construction is such that when the actuator is subjected to a fluid under pressure its piston axially moves the friction element 11 into engagement with the rotatable friction element 9, at which time the friction element 11 rotates to move angularly. The angular movement of the friction element 11 causes the ties 33 to swing about the non-rotatable friction element 10 and to cooperate with and assist the actuator in further axially moving the friction elements 11 and 9 into more effective braking position.

The friction element 11, actuator 29 and ties 33 are returned to their normal or off positions by means of the coil springs 37 located radially inwardly of the non-rotatable friction element 9 and abutting the friction elements 10 and 11.

Figure 6:
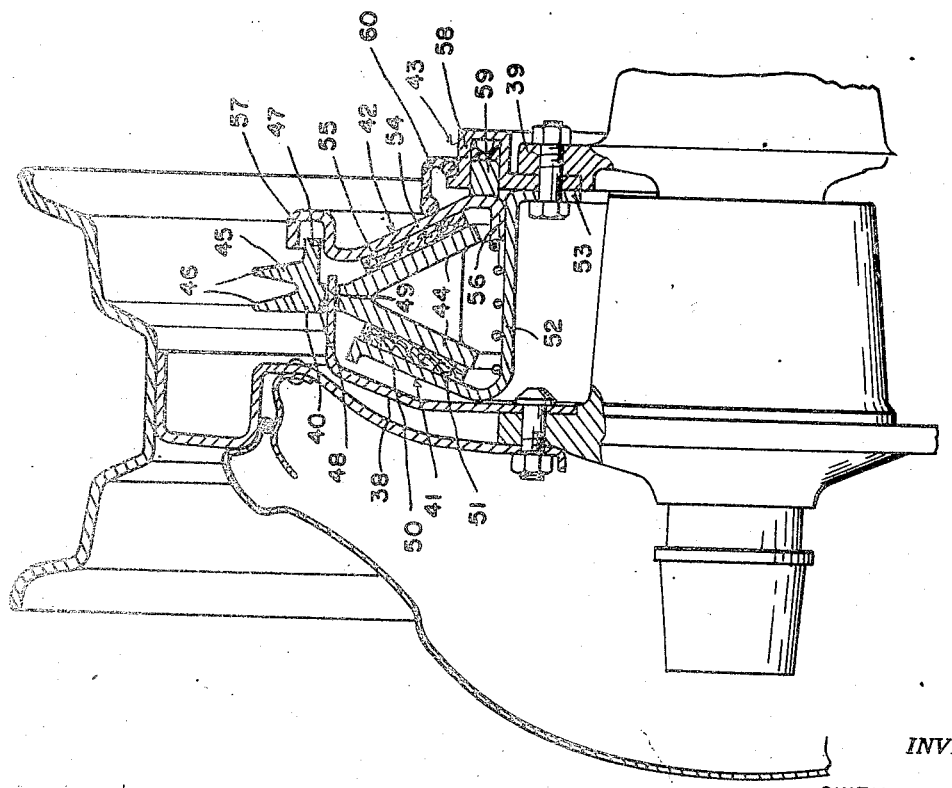
Figure 6 is a view similar to Figure 2 showing another embodiment of the invention.

The brake illustrated in Figure 6 comprises the rotatable carrier 38 secured to the wheel hub, the non-rotatable carrier 39 secured to the axle housing, the rotatable friction element 40 carried by the carrier 38, the non-rotatable friction elements 41 and 42 carried by the carrier 39, and the actuator 43 also carried by the carrier 39. The rotatable friction element 40 has a V-shaped disc body formed of the legs 44 which converge radially outwardly and are integral with the head 45. The latter is provided with the annular radially extending cooling ribs 46 and also with the annular rib 47 which extends axially in an inboard direction and assists in cooling. The rotatable friction element, as shown, is operatively connected to the carrier 38 by being formed with axial holes 48 in its body adjacent its head and receiving the axial tongues 49 upon the carrier 38. The non-rotatable friction element 41 has the disc portion 50 to which is secured the lining 51 for engaging the outboard leg 44. The non-rotatable friction element also has the annular portion 52 at the inboard edge of which is the radial flange 53 for securement to the non-rotatable carrier 39. The non-rotatable friction element 42 has the disc portion 54 to which is secured the lining 55 for engaging the inboard leg 44. This non-rotatable friction element has at its inner edge the annular flange 56 which is splined to the annular portion 52 and is axially slidably mounted thereon. The non-rotatable friction element 42 further has the annular channel 57 at its outer edge for receiving the axial rib 47 of the rotatable friction element. The actuator 43 is annular and is formed with the annular cylinder 58 and the annular piston 59 within the cylinder and engageable with the inner portion of the non-rotatable friction element 42. A suitable annular seal 60 is provided between the annular cylinder 43 and the non-rotatable friction element 42.

Figures 7, 8 and 9 show another modification in which the rotatable carrier is the fixed flange 61 of the wheel hub 62 and the non-rotatable carrier 63 is the steering knuckle. The rotatable friction element 64 is in the nature of a disc having the disc body 65 and the head 66, which latter is provided with the angularly spaced holes 67 for receiving the axial studs 68 upon the fixed carrier 61 near its outer edge. 69 and 70 are, respectively, the non-rotatable outboard and inboard friction elements in the nature of discs located on opposite sides of the rotatable friction element and having linings engageable with the body portion of the rotatable friction element. The non-rotatable outboard friction element has the annular portion 71 and the radial flange 72 at the inner edge of the annular portion and fixedly secured to the non-rotatable carrier. The non-rotatable inboard friction element 70 is splined at its inner edge upon the annular portion 71 and is movable axially in an outboard direction against the retracting coil springs 73 by the annular piston 74 within the annular cylinder 75. The latter is also fixedly mounted on the non-rotatable carrier. 76 are adjustment studs threaded in bosses in the annular cylinder and engageable with the non-rotatable inboard friction element to limit its movement in an inboard direction.

For the purpose of cooling the brake, the rotatable carrier 61 is provided with the holes 77 therethrough near the hub and the head 66 of the rotatable friction element is provided with the axial holes 78 therethrough and with the angularly spaced cooling ribs 79. The non-rotatable outboard element 69 terminates radially inwardly of the cooling ribs and they are shaped to form blades for drawing air through the holes 77 of the rotatable carrier and past both sides of the body 66 during forward movement of the vehicle. To assist in creating a flow of air during the forward movement of the vehicle, there is the annular guard 80 secured to the rotatable carrier 61 at its outer edge and encircling the friction elements. This guard is provided with the louvres 81 which open rearwardly. To further assist in creating the flow of air during the forward movement of the vehicle, the cover plate 82 for the wheel is formed with the louvres 83 which open forwardly.

What I claim as my invention is:

1. In a brake, relatively rotatable friction elements engageable with each other, one of said elements being rotatable and comprising a disc body engageable with the other of said elements and a head radially outwardly beyond said disc body and provided with ribs forming fan blades to create a movement of air past said head.

2. In a brake, rotatable and non-rotatable carriers, a friction member axially movably mounted on said rotatable carrier having a V-shaped body and a ribbed head radially outwardly of said rotatable carrier, a non-rotatable friction member mounted on said non-rotatable carrier and having a portion engageable with one of the legs of said V-shaped body, another non-rotatable friction member axially slidably mounted on said first mentioned non-rotatable friction member and engageable with the other leg of said V-shaped body, and means mounted on said non-rotatable carrier for axially moving said axially movable friction members.

3. In a brake, relatively rotatable friction elements engageable with each other, one of said elements being rotatable and comprising a disc body engageable with the other of said elements and a head radially outwardly beyond said disc body and provided with ribs forming fan blades, and means rotatable with said rotatable element for assisting said ribs in creating a flow of air.

4. In a brake, a rotatable carrier having axial holes therethrough, a non-rotatable carrier, a rotatable friction element carried by said rotatable carrier and comprising a disc body and a head radially outwardly beyond said disc body and formed with axial holes therethrough and provided with ribs at its opposite sides forming fan blades, a non-rotatable friction element carried by said non-rotatable carrier and engageable with said disc body, and a rotatable guard upon said rotatable carrier encircling said head and provided with louvres for assisting said ribs in creating a flow of air past said head.

OWEN M. WHITTEN.